United States Patent
Prasad et al.

(10) Patent No.: US 10,594,434 B2
(45) Date of Patent: Mar. 17, 2020

(54) FEEDBACK SIGNALING MANAGEMENT

(71) Applicant: Nokia Technologies Oy, Espoo (FI)

(72) Inventors: Athul Prasad, Helsinki (FI); Zexian Li, Espoo (FI); Mikko Uusitalo, Helsinki (FI); Jari Petteri Lunden, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/076,793

(22) PCT Filed: Mar. 11, 2016

(86) PCT No.: PCT/FI2016/050149
§ 371 (c)(1),
(2) Date: Aug. 9, 2018

(87) PCT Pub. No.: WO2017/153628
PCT Pub. Date: Sep. 14, 2017

(65) Prior Publication Data
US 2019/0052398 A1     Feb. 14, 2019

(51) Int. Cl.
*H04L 1/00* (2006.01)
*H04B 7/06* (2006.01)

(52) U.S. Cl.
CPC ......... *H04L 1/0027* (2013.01); *H04B 7/0636* (2013.01); *H04L 1/0026* (2013.01); *H04L 2001/0093* (2013.01)

(58) Field of Classification Search
CPC .... H04L 1/0027; H04L 1/0026; H04B 7/0636
See application file for complete search history.

(56) References Cited

U.S. PATENT DOCUMENTS

| | | | | |
|---|---|---|---|---|
| 2002/0183010 A1* | 12/2002 | Catreux | ............... | H04B 7/005 455/67.11 |
| 2004/0165562 A1* | 8/2004 | Elaoud | ............. | H04W 72/0446 370/338 |
| 2005/0138671 A1* | 6/2005 | Love | .................... | H04H 60/11 725/123 |
| 2005/0201296 A1* | 9/2005 | Vannithamby | ....... | H04B 7/0632 370/241 |
| 2006/0039328 A1* | 2/2006 | Ihm | ....................... | H04B 7/063 370/334 |

(Continued)

FOREIGN PATENT DOCUMENTS

WO    WO 2005/079021 A1    8/2005

OTHER PUBLICATIONS

3GPP TSG-RAN WG2#57, Saint Louis, Missouri, Feb. 12-16, 2007, R2-070716, "CQI reporting for E-MBMS AMC", Alcatel-Lucent, 5 pgs.

(Continued)

*Primary Examiner* — Jael M Ulysse
(74) *Attorney, Agent, or Firm* — Harrington & Smith

(57) ABSTRACT

According to an example aspect of the present invention, there is provided an apparatus including a memory configured to store received information, and at least one processing core configured to determine a quality level at which the received information was received, to select, based at least partly on the quality level, a feedback resource, and to decide on causing transmission of feedback on the selected feedback resource.

18 Claims, 6 Drawing Sheets

(56) References Cited

U.S. PATENT DOCUMENTS

| | | | | |
|---|---|---|---|---|
| 2006/0079221 A1* | 4/2006 | Grant | H04B 1/71072 | 455/423 |
| 2006/0133402 A1* | 6/2006 | Dottling | H04L 1/0001 | 370/431 |
| 2008/0049813 A1* | 2/2008 | Kurose | H04L 1/0016 | 375/141 |
| 2008/0153506 A1* | 6/2008 | Yin | H04L 1/0026 | 455/452.2 |
| 2008/0214198 A1* | 9/2008 | Chen | H04L 1/0026 | 455/450 |
| 2008/0225788 A1* | 9/2008 | Inoue | H04L 1/0006 | 370/329 |
| 2009/0154403 A1* | 6/2009 | Niwano | H04W 52/282 | 370/329 |
| 2009/0209264 A1* | 8/2009 | Yang | H04L 1/0026 | 455/452.1 |
| 2009/0268624 A1* | 10/2009 | Imamura | H04W 48/08 | 370/252 |
| 2009/0316811 A1* | 12/2009 | Maeda | H04W 76/11 | 375/260 |
| 2010/0097979 A1* | 4/2010 | Shinozaki | H04L 1/0026 | 370/315 |
| 2010/0128692 A1* | 5/2010 | Aiba | H04W 72/1278 | 370/329 |
| 2010/0246429 A1* | 9/2010 | Hwang | H04H 20/42 | 370/252 |
| 2010/0248733 A1* | 9/2010 | Sato | H04L 1/0026 | 455/452.1 |
| 2010/0309836 A1* | 12/2010 | Sugawara | H04W 72/1231 | 370/312 |
| 2010/0316163 A1* | 12/2010 | Forenza | H04B 7/024 | 375/296 |
| 2011/0002309 A1* | 1/2011 | Park | H04L 1/1607 | 370/335 |
| 2011/0069629 A1* | 3/2011 | Breit | H04B 7/0626 | 370/252 |
| 2011/0149760 A1* | 6/2011 | Shrivastava | H04L 1/0003 | 370/252 |
| 2011/0222483 A1* | 9/2011 | Yuda | H04B 7/063 | 370/329 |
| 2012/0002568 A1* | 1/2012 | Tiirola | H04L 1/0026 | 370/252 |
| 2012/0088458 A1* | 4/2012 | Nogami | H04B 7/0632 | 455/67.11 |
| 2012/0287799 A1* | 11/2012 | Chen | H04B 7/024 | 370/252 |
| 2013/0286940 A1* | 10/2013 | To | H04B 7/0417 | 370/328 |
| 2014/0092881 A1* | 4/2014 | Akimoto | H04W 72/085 | 370/336 |
| 2015/0078331 A1* | 3/2015 | Nishio | H04L 1/0038 | 370/330 |
| 2015/0103794 A1* | 4/2015 | Hoshino | H04W 24/10 | 370/329 |
| 2015/0229456 A1* | 8/2015 | Wild | H04B 7/024 | 375/295 |
| 2015/0257141 A1* | 9/2015 | Kulal | H04W 72/0406 | 370/329 |
| 2016/0088646 A1* | 3/2016 | Sun | H04B 7/0456 | 370/329 |
| 2016/0249368 A1* | 8/2016 | Sadiq | H04W 4/70 | |
| 2016/0381565 A1* | 12/2016 | Oteri | H04W 16/14 | 370/328 |

OTHER PUBLICATIONS

3GPP TSG-RAN WG2 #57, St. Louis, USA, Feb. 15-19, 2007, R2-070909, "MBMS rate control and feedback suppression", TD-Tech, 4 pgs.

* cited by examiner

FEEDBACK SIGNALING MANAGEMENT

This patent application is a U.S. National Stage application of International Patent Application Number PCT/FI2016/050149 filed Mar. 11, 2016, which is hereby incorporated by reference in its entirety.

FIELD

The present invention relates to management of feedback signalling in a communication network.

BACKGROUND

Communicating information over a communication medium, such as a cable or a radio channel, entails several challenges. Firstly, the information needs to be receivable at a receiver at a quality level that is appropriate for the application used. For example, where the information is a digital video, the communication rate, or bitrate, will typically be relatively high, and individual bit errors may be considered tolerable as a user is unlikely to notice them. On the other hand, where the information comprises digital files that are to be copied from the transmitter to the receiver, bit errors are not acceptable as the files would thereby become corrupted in transit. Error correction coding may be applied to detect and correct individual bit errors, such that a non-zero bit-error rate, BER, may be present with a zero block error rate, BLER.

Secondly, energy used in communicating the information should be sufficient to enable the communication at a sufficient quality level, but not an excessive quality level. For example in wireless communication, using excessive power in communication may cause interference in radio resources, which limits the overall capacity of the wireless communication system. For example, in code-division multiple access, CDMA, based wireless systems, many transmitting and receiving stations share the same frequency band, wherein communications effected using orthogonal codes appear as background noise to other stations. The higher the power used, the higher this noise level will appear to the other stations, and the other stations will need to use more power in their respective communications, further increasing the interference level. Of course, where communicating stations are battery-powered, using excessive transmit power will also drain battery resources unnecessarily quickly. Therefore, using a power level that is sufficient but not excessive is preferred.

Thirdly, feedback may be provided from a receiver to the transmitter to enable the transmitter to modify its transmission. For example, when a receiver determines that information is being transmitted at an unnecessarily high power, it may advise the transmitter, using feedback, that transmission power may be reduced. On the other hand, where a receiver determines that a bit and/or block error rate is too high, it may provide feedback advising the transmitter to increase transmit power.

Apart from, or instead of adapting transmit power, also other transmission parameters can be modified depending on the feedback. For example, modulation and coding parameters can be changed to better match the received signal quality.

SUMMARY OF THE INVENTION

The invention is defined by the features of the independent claims. Some specific embodiments are defined in the dependent claims.

According to a first aspect of the present invention, there is provided an apparatus comprising a memory configured to store received information, and at least one processing core configured to determine a quality level at which the received information was received, to select, based at least partly on the quality level, a feedback resource, and to decide on causing transmission of feedback on the selected feedback resource.

Various embodiments of the first aspect may comprise at least one feature from the following bulleted list:
- the selected feedback resource comprises at least one of a time resource, a frequency resource, and a code
- the at least one processing core is configured to select the feedback resource based at least partly on a mapping from a set of quality level ranges to a set of feedback resources
- the at least one processing core is configured to select an earlier feedback resource responsive to the quality level being lower, and a later feedback resource responsive to the quality level being higher
- the at least one processing core is configured to perform at least one of the following: select an earliest feedback resource responsive to the quality level being less than a lowest threshold quality level; and not send a feedback responsive to the quality level being higher than a highest threshold quality level
- the at least one processing core is configured to cause the transmission of the feedback using a contention-based mechanism
- the at least one processing core is configured to cause the transmission of the feedback to occur while the apparatus is in an idle mode with respect to a communication network that receives the feedback
- the at least one processing core is configured to process a request from the communication network, and responsive to the request, transition to a connected state with respect to the communication network
- the at least one processing core is configured to decide to suppress transmission of the feedback responsive to determining that another apparatus has transmitted feedback using a feedback resource associated with a quality level that is inferior to the determined quality level
- at least one of feedback resources are service dependant; and quality levels are service dependant
- the at least one processing core is configured to decide to suppress transmission of the feedback responsive to receiving modified radio parameters in the apparatus
- the feedback comprises feedback concerning a broadcast service or a multicast service
- the apparatus is configured to receive, from a base station, an indication of a lowest quality level associated with feedback received in the base station, and responsive to determining the determined quality level is inferior to the indicated quality level, the at least one processing core is configured to increase a transmission power used in transmitting feedback According to a second aspect of the present invention, there is provided an apparatus comprising at least one processing core, at least one memory including computer program code, the at least one memory and the computer program code being configured to, with the at least one processing core, cause the apparatus at least to transmit information to devices, receive, from the devices, feedback concerning reception of the information, wherein feedback indicating a first reception quality is transmitted on a first feedback resource and feedback indicating a second reception quality is transmitted on a second feedback resource, and decide on modifying a transmission parameter based at least partly on the received feedback.

Various embodiments of the second aspect may comprise at least one feature from the following bulleted list:

- the apparatus is configured to not listen to feedback on the second feedback resource if feedback is received on the first feedback resource
- at least one memory and the computer program code are configured to, with the at least one processing core, cause the apparatus to estimate a number of devices transmitting feedback on the at least one feedback resource by estimating an interference over noise ratio concerning the first feedback resource
- the at least one memory and the computer program code are configured to, with the at least one processing core, cause the apparatus to modify a periodicity at which the transmission parameter is modified responsive to the feedback indicating only few user equipments experience poor reception quality
- the at least one memory and the computer program code are configured to, with the at least one processing core, cause the apparatus to provide to the devices a mapping from a set of quality level ranges to a set of feedback resources.

According to a third aspect of the present invention, there is provided a method comprising storing received information in an apparatus, determining a quality level at which the received information was received, selecting, based at least partly on the quality level, a feedback resource, and deciding on causing transmission of feedback on the selected feedback resource.

Various embodiments of the third aspect may comprise at least one feature corresponding to a feature from the preceding bulleted list laid out in connection with the first aspect.

According to a fourth aspect of the present invention, there is provided a method, comprising transmitting, from an apparatus, information to devices, receiving, from the devices, feedback concerning reception of the information, wherein feedback indicating a first reception quality is transmitted on a first feedback resource and feedback indicating a second reception quality is transmitted on a second feedback resource, and deciding on modifying a transmission parameter based at least partly on the received feedback.

Various embodiments of the fourth aspect may comprise at least one feature corresponding to a feature from the preceding bulleted list laid out in connection with the second aspect.

According to a fifth aspect of the present invention, there is provided an apparatus comprising means for storing received information in an apparatus, means for determining a quality level at which the received information was received, means for selecting, based at least partly on the quality level, a feedback resource, and means for deciding on causing transmission of feedback on the selected feedback resource.

According to a sixth aspect of the present invention, there is provided an apparatus comprising means for transmitting information to devices, means for receiving, from the devices, feedback concerning reception of the information, wherein feedback indicating a first reception quality is transmitted on a first feedback resource and feedback indicating a second reception quality is transmitted on a second feedback resource, and means for deciding on modifying a transmission parameter based at least partly on the received feedback.

According to a seventh aspect of the present invention, there is provided a non-transitory computer readable medium having stored thereon a set of computer readable instructions that, when executed by at least one processor, cause an apparatus to at least store received information in an apparatus, determine a quality level at which the received information was received, select, based at least partly on the quality level, a feedback resource, and decide on causing transmission of feedback on the selected feedback resource.

According to an eighth aspect of the present invention, there is provided a non-transitory computer readable medium having stored thereon a set of computer readable instructions that, when executed by at least one processor, cause an apparatus to at least transmit information to devices, receive, from the devices, feedback concerning reception of the information, wherein feedback indicating a first reception quality is transmitted on a first feedback resource and feedback indicating a second reception quality is transmitted on a second feedback resource, and decide on modifying a transmission parameter based at least partly on the received feedback.

According to a ninth aspect of the present invention, there is provided a computer program configured to cause a method in accordance with at least one of the third and fourth aspects to be performed.

EMBODIMENTS

With an increasing number of communicating devices over wireless networks, there is a need for improved methods for sending feedback about the quality of the received signal.

Providing feedback on feedback resources selected based on a reception quality level may enable a transmitter to estimate a number of recipients in a quality level without decoding each and every feedback. Likewise, when feedback resources associated with poor reception quality levels are temporally earlier, some recipient devices may forego transmitting their feedback, if they determine that feedback necessitating a change in transmission parameters has already been transmitted by other recipient devices.

Figure 1:
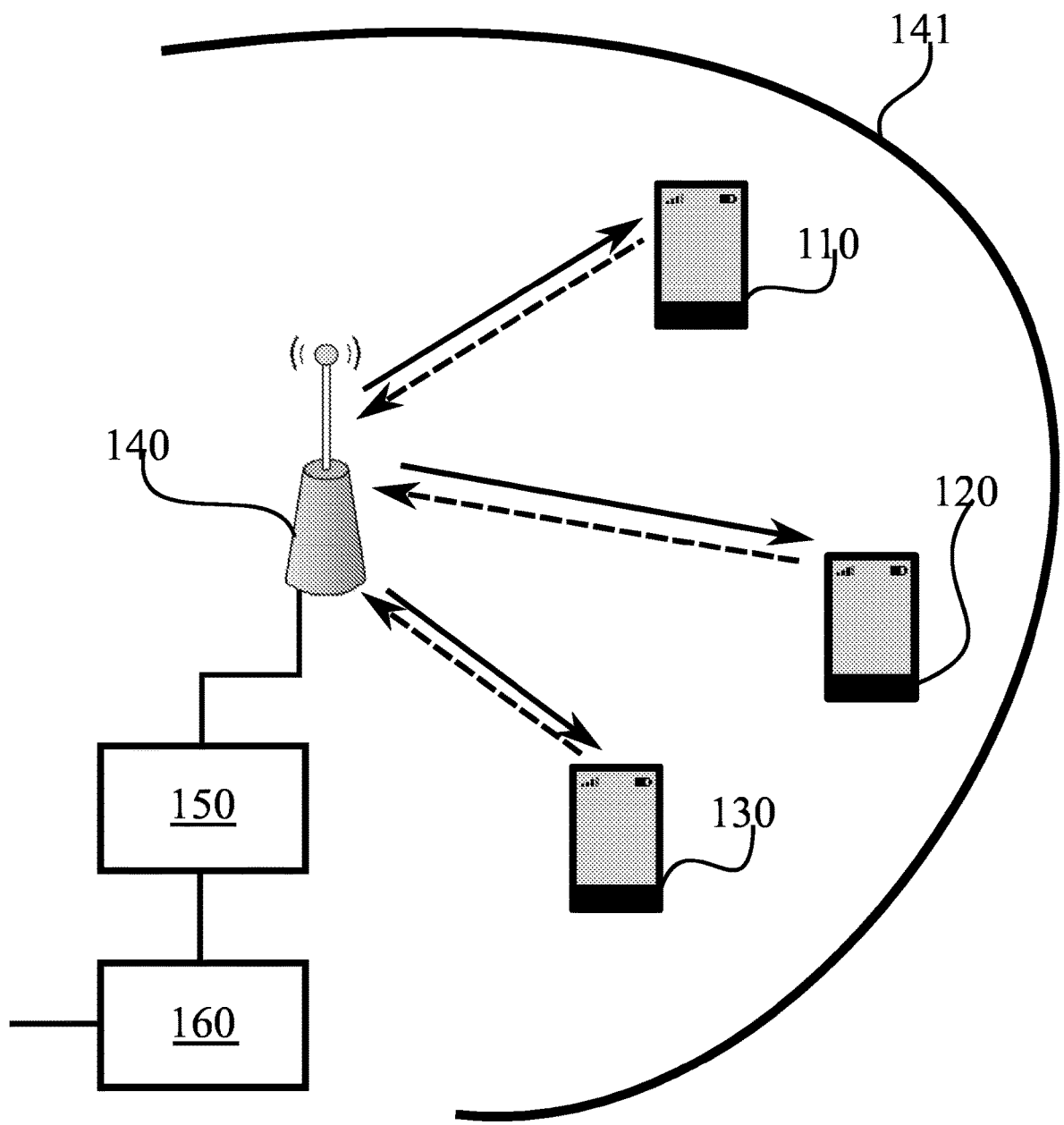
FIG. 1 illustrates and example system in accordance with at least some embodiments of the present invention.

FIG. 1 illustrates an example system in accordance with at least some embodiments of the present invention. FIG. 1 illustrates a base station 140, which may comprise a cellular or non-cellular base station. A non-cellular base station may be alternatively referred to as an access point, for example. Base station 140 may be configured to act in accordance with a cellular or non-cellular communication technology, accordingly. Examples of cellular communication technologies include wireless code division multiple access, WCDMA, long term evolution, LTE, interim standard 95, IS-95, and fifth generation cellular technology. Examples of non-cellular communication technologies include wireless local area network, WLAN, and worldwide interoperability for microwave access, WiMAX.

Devices 110, 120 and 130 may comprise devices arranged to receive information from base station 140. These can be devices that need human interaction (often referred to as UE devices), or devices that do not need human interaction, such as various types of machine type communication, MTC devices. Devices 110, 120 and 130 are configured to receive information in accordance with a same communication technology as base station 140 uses in transmitting the information, to thereby achieve interoperability. For example, each of devices 110, 120 and 130 may receive the information from base station 140 over a wireless interface, using electromagnetic waves, such as radio waves.

Communication between base station 140 and each of devices 110, 120 and 130 may be bidirectional, wherein the communication comprises a downlink for conveying information from base station 140 toward the devices, and an uplink for conveying information from device 110, 120 and 130 toward base station 140. For example, the downlink may be used to transmit information from base station 140, and the uplink may be used to convey feedback concerning reception of the information toward base station 140.

Base station 140 may be configured to control a cell. A boundary of a coverage area of such a cell is indicated schematically as contour 141 in FIG. 1. Furthermore, base station 140 may be coupled to network node 150, which may, in turn, be coupled to further network node 160. Further network node 160 may have connectivity to further networks, for example. Such further networks are not illustrated in FIG. 1. Network node 150 may comprise a base station controller or mobility management entity, for example. Further network node 160 may comprise a switch or gateway, for example. Through network node 150 and further network node 160, base station 140 may be enabled to provide connectivity to the internet, for example, to devices attached to a cell controlled by base station 140.

Base station 140 may transmit information to devices 110, 120 and 130 by unicasting, multicasting or broadcasting, for example. In unicasting, information is transmitted to a single receiving device, for example device 120. The receiving device may provide feedback information to base station 140, such that a hybrid-ARQ, HARQ, process may be utilized to increase spectral efficiency of unicast communication. In HARQ, base station 140 may transmit incremental redundancy information to assist device 120 to successfully decode a received block, in case decoding initially is unsuccessful. Thus in unicasting, a feedback channel is provided to enable the transmitter and receiver to collaborate in delivering the information in an energy-efficient manner.

In multicasting and broadcasting, information is transmitted to multiple recipients. The information may comprise, for example, different kind of multimedia information, configuration information, alerts, and any other type information. The number of recipients may be high, such as, for example, 500, 1000 or higher. Multicasting or broadcasting may lack a dedicated feedback channel in the uplink direction separately for each receiver. As such, a transmission range for multicasting or broadcasting may be lower than for unicasting, since HARQ, available in unicasting, increases spectral efficiency and thus enables communicating over a larger distance using a given maximum allowed transmit power. Devices receiving multicast or broadcast transmission may provide feedback identifying quality level at which a block of information was received. Such feedback transmission may take place using shared feedback resources, which may comprise a shared radio channel, for example.

In FIG. 1, information transmitted from base station 140 to devices 110, 120 and 130 is denoted by a solid arrow, pointing from base station 140 to the devices. Feedback is denoted by a dashed arrow, pointing from the devices to base station 140. In certain embodiments, the devices are enabled to listen on feedback transmitted by other devices, such that, for example, device 110 can listen to feedback transmitted by device 120, for example in case device 110 transmits its own feedback at a different time than device 120. In case the number of receiving devices is very large, the feedback they transmit back to base station 140 may cause a strain on resources used to convey the feedback, or on the communication system more broadly. A resource used to convey feedback may be referred to as a feedback resource. A feedback resource may comprise a radio resource, which may be defined in terms of frequency, code, time or various combinations of these. For example, a set of frequencies and/or codes may be provided for use being further time-multiplexed into timeslots. Such timeslots, possibly together with the frequencies and/or codes, may be considered to be a set of feedback resources.

Multi-dimensional feedback resources may separate feedback with respect to different dimensions. For example, a particular frequency resource may be used for sending feedback for a particular service, while a particular time resource may be used for sending feedback for a particular quality level. Time and frequency are only examples, and in different embodiments different type of orthogonal resources can be used for separating quality threshold levels and/or services, such as orthogonal preambles. Using time slots for separating quality levels is however a preferred embodiment, since it allows devices experiencing worse quality levels transmit their feedbacks first.

It would be overall advantageous, if the quantity of feedback transmitted to base station 140 could be reduced. A further advantage would be obtained, in case a device need not transition to a connected state with respect to the base station to transmit the feedback, as transitioning to the connected state may involve further signalling.

Once a receiving device, such as for example device 110, has received a block of information from base station 140, it may store the block of information, at least transiently. From the stored information, the device may determine a quality level at which the information was received. The quality level may be determined based on BER, BLER, or another measure, such as a signal to interference ratio, or a combination of measures. In some embodiments, cyclic redundancy check, CRC, algorithms are employed to assess, whether the block of information was correctly received. Based on the quality level, device 110 may decide on transmitting feedback to base station 140. Such deciding may comprise deciding whether to transmit feedback or to not transmit the feedback. For example, if the quality is considered suitable, the device may not need to transmit the feedback, and if the quality is poor, the device may at least consider transmitting feedback.

If feedback is to be transmitted, the feedback may be transmitted on the selected feedback resource.

The feedback resource may be selected based on a mapping from a set of quality level ranges to a set of feedback resources. In detail, device 110 may determine a quality level range where the determined quality level is comprised, and then select a feedback resource associated, via the mapping, with this quality level range. The mapping may associate earlier feedback resources with lower quality level ranges. In other words, the mapping may cause feedback indicating a poor reception quality level to be transmitted using an earlier feedback resource. For example, an earlier timeslot in a frequency-time feedback resource set may be selected when the quality level is low. The mapping may likewise associate later feedback resources with higher quality level ranges.

In particular, the mapping may associate an earliest feedback resource, for example a first timeslot, with a lowest threshold quality level. In other words, in case the quality level falls in a lowest bracket, which may be defined as all quality levels inferior to a threshold, the earliest feedback resource may be responsively selected.

A feedback resource may be selected additionally or alternatively depending on a particular service. For example, feedback for a particular service can be sent on a particular frequency resource. Thus, the selected time-frequency resource may identify the quality level experienced for a particular service.

The decision on transmitting feedback may be based, at least partly, on feedback transmitted towards base station 140 by further devices of the same type as device 110, or by further devices, using same service as device 110. In detail, device 110 may listen to feedback transmitted by the other devices to decide, whether it is necessary for device 110 to transmit its own feedback.

In some embodiments, base station, after receiving feedback from some devices, may indicate to other devices directly or indirectly that further feedback is not needed.

In some embodiments, base station, after receiving feedback from some devices, will send modified radio parameters. The other devices, noticing enhanced quality will not need to send the feedback. Alternatively, network sending modified radio parameters can be seen by the devices as an acknowledgement from the network indicating that further feedback is not needed.

The decision on transmitting feedback may be based, at least partly, on a determination as to whether other devices have transmitted feedback indicating a lower quality level than was determined in device 110. Since such lower quality levels may be reported using feedback resources that are earlier than the one device 110 would use, device 110 may detect their use before the feedback resource it has selected becomes available for use. In case such lower quality levels are reported by other devices, device 110 may decide to suppress transmitting its own feedback, since base station 140 may in any case react to the lower quality levels already reported by other receiving devices. In this case, the feedback from device 110 would only consume network resources without affecting transmission parameters used in base station 140.

In some embodiments, a receiving device has a quality level threshold, such that in case a quality level of reception is higher than this threshold, the receiving device will always decide to suppress sending feedback.

In some embodiments, devices transmitting feedback may include therein an indication relating to a location of the device and/or an identifier of the device.

Feedback may be transmitted from devices 110, 120 and/or 130 using a contention-based mechanism, while the device is in an idle state with respect to base station 140 and/or a cell controlled by base station 140. As was described earlier, remaining in an idle state conserves device power and network resources, and becomes increasingly useful as the number of receiving devices increases in the cell. The feedback, which may be provided in a mechanism resembling a random access procedure, may comprise an indication that actual access to the network is not thereby sought. Since the feedback resource is associated with the quality level being communicated to base station 140, the feedback need not, in some embodiments, comprise a separate indication of the quality level. Base station 140 may determine from the feedback resources used, which quality levels were determined in receiving devices. After receiving the feedback on a particular resource, base station may also estimate a number of devices experiencing a particular quality level. As such, base station 140 need not know an identity of a device that sends a specific item of feedback, rather, base station 140 may determine the quality level associated with the item of feedback based on the mapping and determining which feedback resource was used. In some cases, an advantage of using the contention-based mechanism is that the base station need not decode the feedback, but can merely detect that energy is present on a feedback resource.

Base station 140 may request individual receiving devices to provide additional information, such as information on their location in the cell. Responsive to such a request, devices may transition to the connected state to provide the requested information.

In some embodiments, base station 140 is configured to transmit, for example by broadcasting or multicasting, an indication of the lowest quality level concerning which it received feedback in a previous round. Receiving devices may receive this indication and compare it to the quality level they reported in the previous round. In case the quality level indicated by base station 140 is higher than the one a specific receiving device reported in the previous round, the specific receiving device may determine to increase a power at which it will provide future feedback. This is so, since base station 140 would in this case appear to not have become aware of the feedback the specific device reported in the previous round.

Base station 140, for its part, may determine quality levels associated with feedback it receives, and responsive to the quality levels, modify at least one transmission parameter as a response to the feedback. For example, if feedback is largely conveyed on feedback resources associated with low quality levels, base station 140 may increase a transmit power and/or switch to using a simpler modulation and/or coding. On the contrary, if the quality levels are high, base station 140 may reduce transmit power and/or switch to using more robust modulation and/or coding.

Base station 140 may estimate a number of devices experiencing certain quality level by estimating an interference over noise value on the specific feedback resource. Thus, decoding the feedback itself may be unnecessary if an estimate of the number of feedback-transmitting devices can be estimated using the interference over noise value.

In case only a few receiving devices report a low quality level, base station 140 may responsively modify a periodicity at which feedback is provided and the transmission parameter modified. This is so, since the devices seem to receive the information transmitted from base station 140 without difficulty, and providing feedback may take place less frequently, which again reduces the quantity of feedback in the system, potentially leaving resources free for other uses and/or for using less power in communication.

Base station 140 may configure a mapping to be used in determining which feedback resource to use with which range of quality level. This configuration may comprise base station 140 providing the mapping to the receiving devices, wherein this providing may take place on a physical layer, or by conveying through application-layer signalling.

Figure 2:
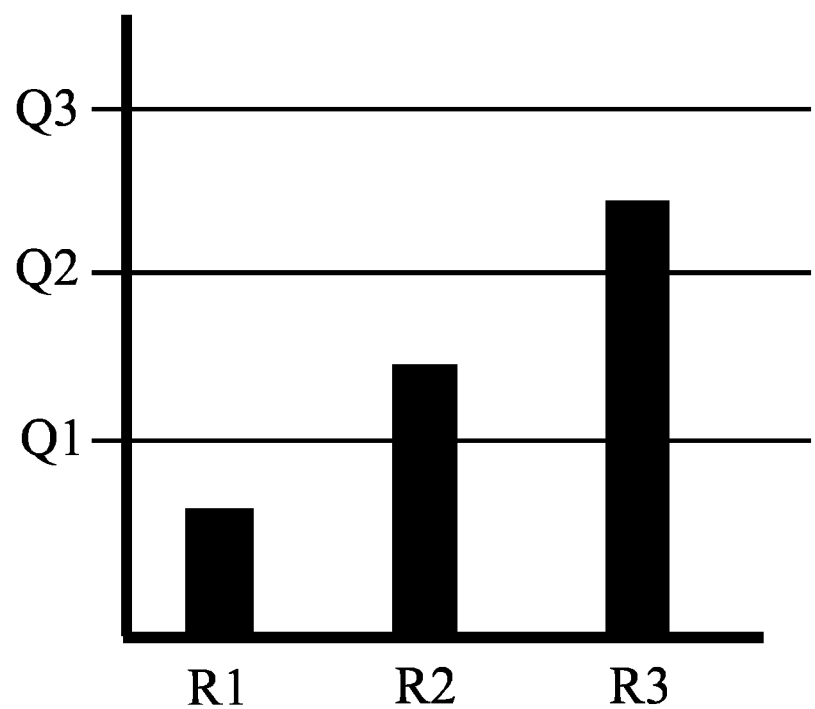
FIG. 2 illustrates mapping from a set of quality level ranges to a set of feedback resources.

FIG. 2 illustrates a mapping from a set of quality level ranges to a set of feedback resources. On the vertical axis are disposed quality level thresholds. Three ranges are disposed on this axis: firstly, quality levels inferior to quality level Q1, secondly, quality levels between quality level Q1 and quality level Q2, and thirdly, quality levels between quality level Q2 and quality level Q3.

On the horizontal axis are denoted three feedback resources: R1, R2 and R3. The black bar at R1 illustrates a quality level associated with feedback that will be transmitted using feedback resource R1, namely, the quality level is lower than the threshold Q1. The black bar at R2 illustrates a quality level associated with feedback that will be transmitted using feedback resource R2, namely, the quality level is higher than threshold Q1 and lower than threshold Q2. The black bar at R3 illustrates a quality level associated with feedback that will be transmitted using feedback resource R3, namely, the quality level is higher than threshold Q2 and lower than threshold Q3. The number of feedback resources in FIG. 2 is an example only, and in various embodiments of the invention the number of quality level ranges and feedback resources may be, for example, one, two, five or seven, alternatively to the three illustrated in FIG. 2. For the defined quality thresholds Q1, ... Q_N, in some embodiments, devices, experiencing quality level higher than the highest threshold Q_N, may not need to send feedback, since their experienced quality level is considered acceptable.

The feedback resources in FIG. 2 may be, for example, time slots. Thus, R1 occurs before R2 in time domain. In this case, the users experiencing quality level below threshold Q1 may send their feedback first, followed by the possible feedback from users experiencing quality level between Q1 and Q2. In some embodiments, after receiving the feedback from the devices experiencing the worst quality, network will modify transmission parameters, and other devices, which experienced the quality below the highest defined threshold, but which have not yet sent their feedbacks, will not need to send the feedbacks. This way, only the users, experiencing the worst quality, will send their feedback.

The feedback resources used for quality levels can be also other resources, for example codes, frequency resources or orthogonal preambles. In general, it is not important what kind of resources is used. The main principle is that the used resources have be orthogonal in a sense that they have to separate the feedbacks related to different quality level ranges.

Additionally or alternatively, different services may be separated by another type of resource. For example, Different services multiplexed into same multimedia broadcast multicast service, MBMS, bearer/service flow can be differentiated by using different frequency resources for sending feedback.

Feedback resources (within one type) for separating different quality levels may be the same across different services, or those may be different. If the resources (e.g. time resource) used for separating different quality levels are the same across different services, then another feedback resource dimension (such as e.g. frequency resource) may be used to separate different services. However, if the resources (within one type) used for separating different quality levels are different across different services, then the second feedback resource dimension is not necessarily needed as the network will know both the quality level and the service it corresponds to already based on the first type of feedback resource. The latter would however (in case of time slots) introduce additional delays.

The quality levels may be common across different services, or alternatively quality levels may be separately defined for each particular service. The network may also adaptively reconfigure the quality threshold levels to better match radio conditions. The better the quality threshold levels are set, the earlier the network may receive the feedback.

With the quality thresholds Q1, ..., Q_N and in case of time slots used for quality level reporting, the network will always know what is the worst experienced quality based on already the first set of feedbacks received. For example, if the first feedback is received only at time T_N, the network will know that the worst experienced quality is within quality range between Q_(N−1) and Q_N. The network may also estimate the number of devices experiencing such quality level. Based on this information, the network may adapt the MCS accordingly.

In fifth generation cellular networks, multicast broadcast services are expected to provision basic signalling information such as system information blocks, master information blocks to all the devices in the network, in order to improve the coverage which is limited in higher frequency bands, and resource utilization for sending such information. Such transmission technologies are also proposed to be used to provide various messages to massive MTC devices with high deployment density. By optimizing the amount of feedback required to provide such services in an efficient manner would be necessary in such networks.

Figure 3:
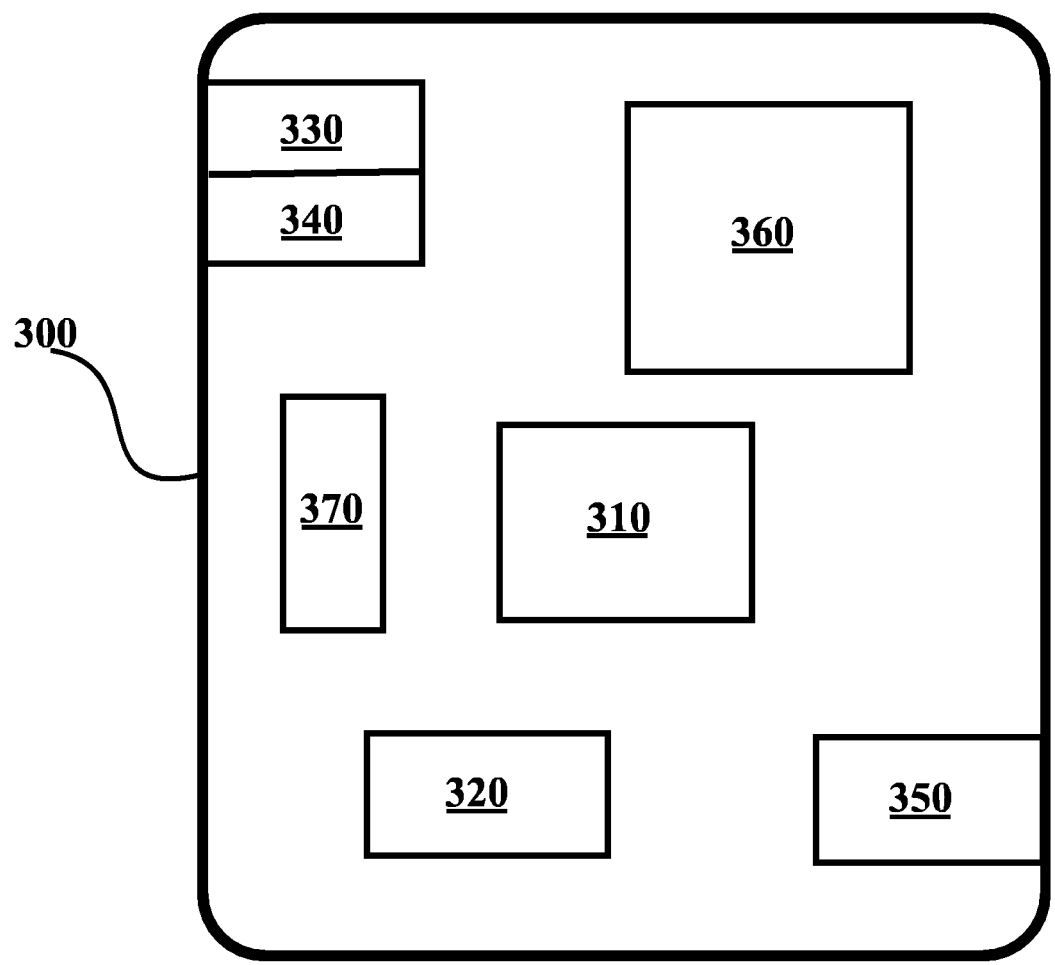
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as device 110 or, in applicable parts, base station 140 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept consume broadcasted or multicasted content.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
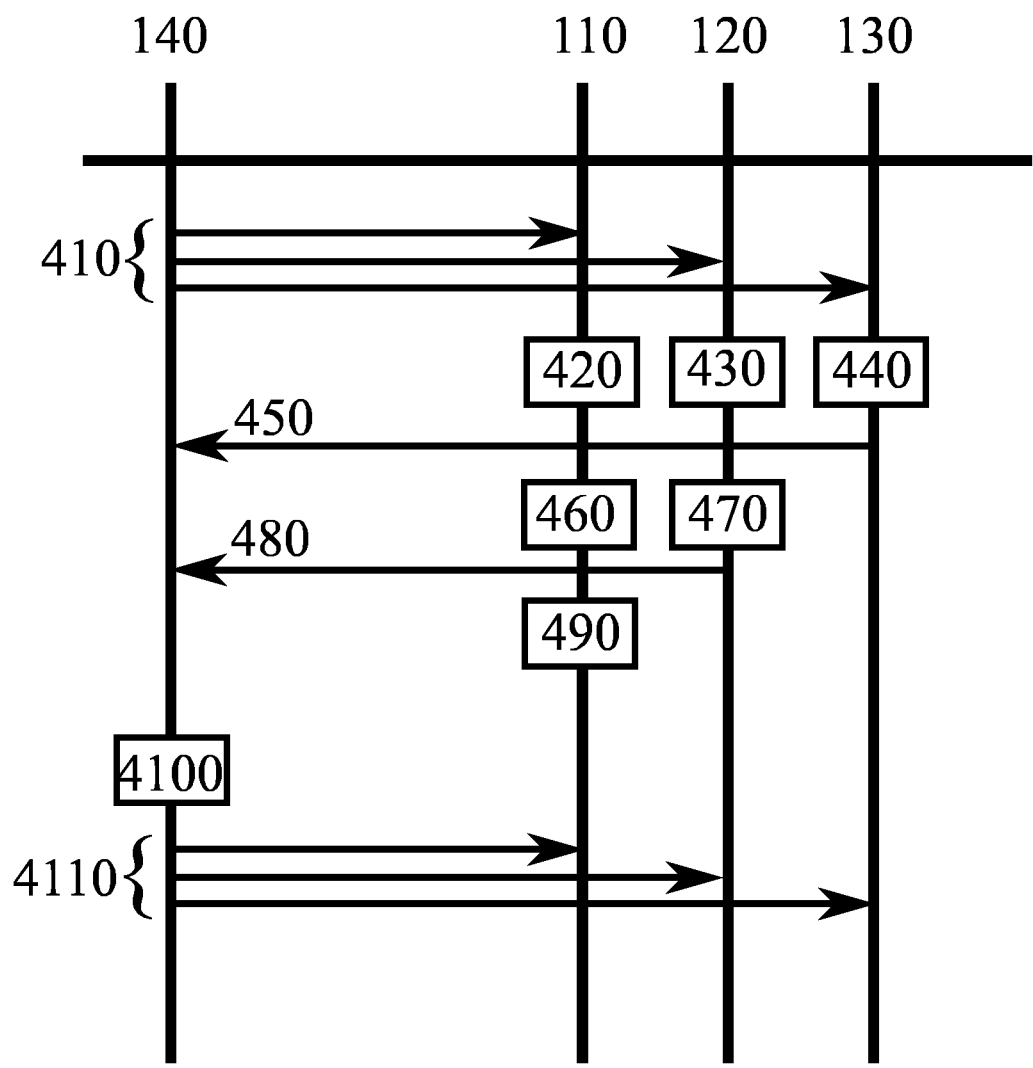
FIG. 4 illustrates signalling in accordance with at least some embodiments of the present invention.

FIG. 4 illustrates signalling in accordance with at least some embodiments of the present invention. On the vertical axes are disposed, on the left, base station 140, and on the right, receiving devices 110, 120 and 130. Time advances from the top toward the bottom.

In collective phase 210, base station 140 transmits information to receiving devices 110, 120 and 130. This transmission may be a multicast or broadcast transmission, for example. This transmission may comprise transmitting separate messages to the receiving devices or, alternatively, a single message addressed to or intended for the receiving devices.

In phases 420, 430 and 440 device 110, device 120 and device 130, respectively, determine quality levels at which the information was received. In the example of FIG. 4, device 110 receives the information at a high quality level and devices 120 and 130 receive the information at low quality levels. In these phases, the receiving devices may also select feedback resources, such that devices 120 and 130, having determined low quality levels, select early feedback resources and device 110, having determined a high quality level, selects a late feedback resource.

In phase 450, device 130 transmits feedback using the selected feedback resource. In phases 460 and 470, devices 110 and 120, respectively, detect the feedback of phase 450, transmitted on the feedback resource used by device 130. In detail, in phase 420 device 110 detects that a device used a feedback resource that is associated with a quality level lower than that determined in phase 420 in device 110.

In phase 480, device 120 transmits feedback using the selected feedback resource. In phase 490 devices 110 detects the feedback of phase 450, transmitted on the feedback resource used by device 120. In detail, in phase 490 device 110 detects that a device used a feedback resource that is associated with a quality level lower than that determined in phase 420 in device 110. In phase 490, device 110 decides that, in light of the feedback already provided in phases 450 and 480, device 110 need not transmit its own feedback, since it would probably not affect a decision in base station 140.

In phase 4100 base station 140 assesses feedback received as a response to the transmission of phase 410. In detail, as feedback of phases 450 and 480 indicates a low quality level, base station 140 may in phase 4100 increase a transmit power, for example. Thereafter, in phase 4110, the next round of transmission is performed using the increased transmission power level.

Figure 5:
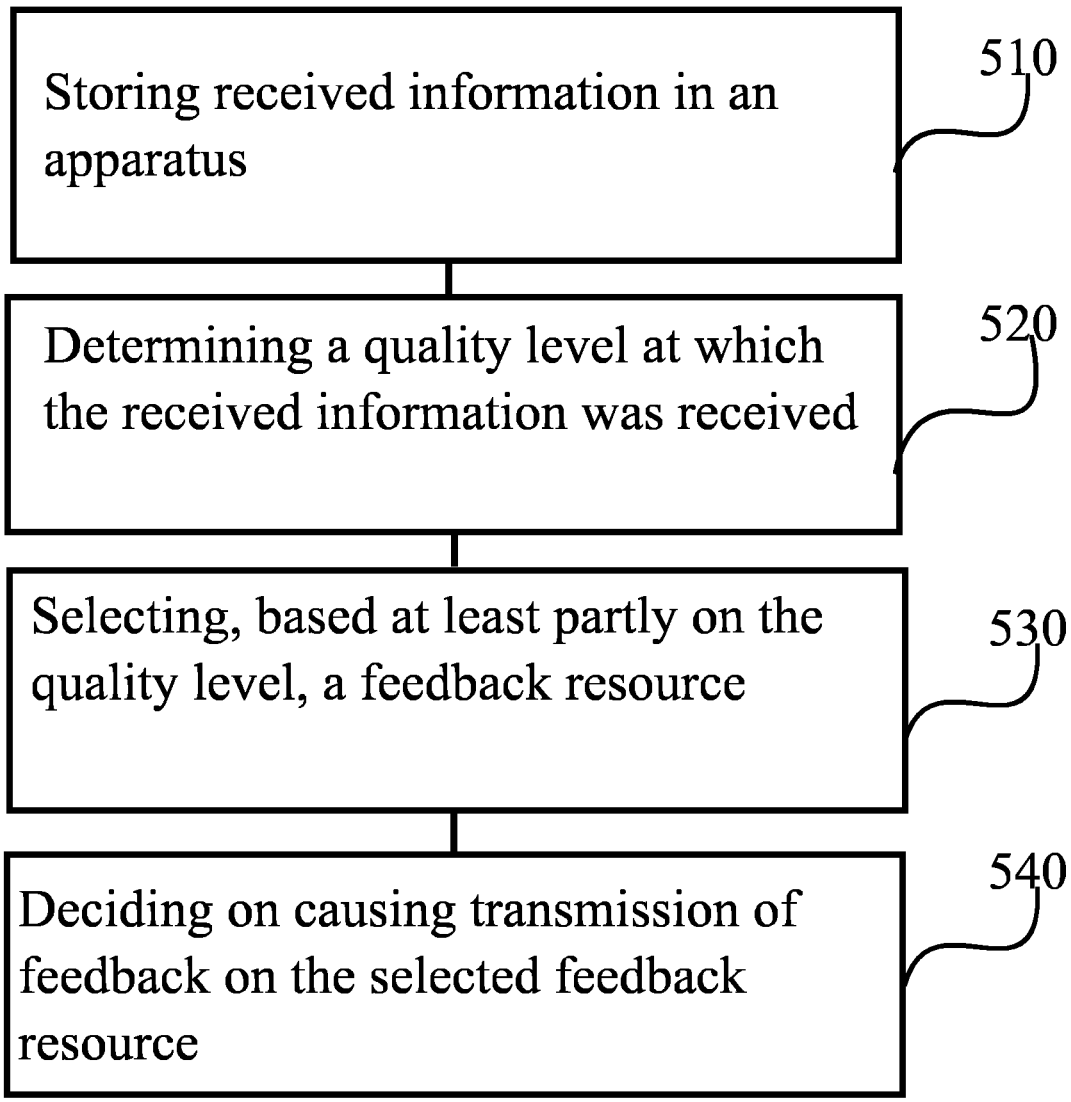
FIG. 5 is a flow graph of a method in accordance with at least some embodiments of the present invention.

FIG. 5 is a flow graph of a method in accordance with at least some embodiments of the present invention. The phases of the illustrated method may be performed in device 110, or in a control device configured to control the functioning thereof, when implanted therein.

Phase 510 comprises storing received information in an apparatus. Phase 520 comprises determining a quality level at which the received information was received. Phase 530 comprises selecting, based at least partly on the quality level, a feedback resource. Finally, phase 540 comprises deciding on causing transmission of feedback on the selected feedback resource. The deciding may comprise deciding to cause the transmission to take place. The deciding may comprise deciding to suppress the transmission of the feedback, for example in case feedback relating a quality level lower than the determined quality level is detected.

Figure 6:
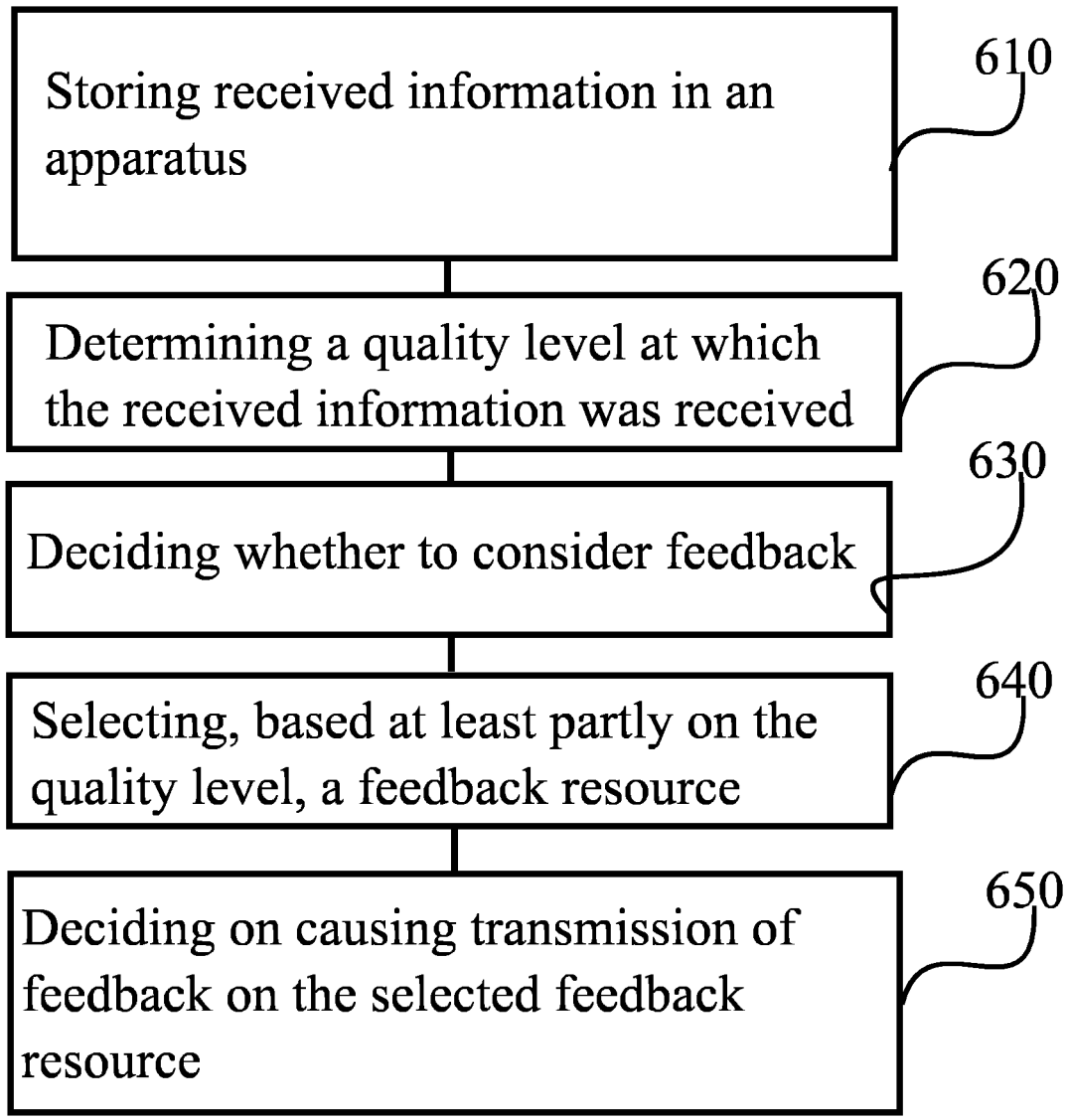
FIG. 6 is a flow graph of a method in accordance with at least some embodiments of the present invention.

FIG. 6 is a flow graph of a method in accordance with at least some embodiments of the present invention. The phases of the illustrated method may be performed in device 110, or in a control device configured to control the functioning thereof, when implanted therein.

Phase 610 comprises storing received information in an apparatus. Phase 620 comprises determining a quality level at which the received information was received. Phase 630 comprises deciding whether to consider feedback. As described above, in case the quality level is above a threshold, the device may decide to forego transmitting feedback overall. In case feedback is decided to be considered, processing advances to phase 640. Otherwise, processing ends in phase 630. Phase 640 comprises selecting, based at least partly on the quality level, a feedback resource. Finally, phase 650 comprises deciding on causing transmission of feedback on the selected feedback resource. The deciding may comprise deciding to cause the transmission to take place. The deciding may comprise deciding to suppress the transmission of the feedback, for example in case feedback relating a quality level lower than the determined quality level is detected.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing communication in communication networks.

Acronyms List

ARQ automatic repeat request
BER bit-error rate
BLER block error rate
CDMA code-division multiple access
CRC cyclic redundancy check
HARQ hybrid-ARQ
IS-95 interim standard-95
LTE long term evolution
WCDMA wireless code division multiple access
WiMAX worldwide interoperability for microwave access
WLAN wireless local area network

REFERENCE SIGNS LIST

| | |
|---|---|
| 110, 120, 130 | Receiving devices |
| 140 | Base station |
| 141 | Edge of cell controlled by base station 140 |
| 150 | Network node |
| 160 | Further network node |
| R1, R2, R3 | Feedback resources (FIG. 2) |
| Q1, Q2, Q3 | Quality level thresholds (FIG. 2) |
| 300-370 | Structure of the apparatus of FIG. 3 |
| 410-4110 | Phases of the method of FIG. 4 |
| 510-540 | Phases of the method of FIG. 5 |

The invention claimed is:

1. An apparatus comprising:
   a non-transitory memory configured to store received information; and
   at least one processing core configured to:
      determine a quality level at which the received information was received, select, based, at least partially, on the determined quality level and a mapping from a set of quality level ranges to a set of feedback resources, a feedback resource, and decide on causing transmission of feedback on the selected feedback resource, wherein the at least one processing core is configured to decide to suppress the transmission of the feedback responsive to determining that another apparatus has transmitted feedback using a feedback resource associated with a quality level that is inferior to the determined quality level.

2. The apparatus according to claim 1, wherein the selected feedback resource comprises at least one of a time resource, a frequency resource, or a code.

3. The apparatus according to claim 1, wherein the mapping comprises at least one of:

mapping an earlier feedback resource to a lower quality level range, or mapping a later feedback resource to a higher quality level range.

4. The apparatus according to claim 3, wherein the at least one processing core is configured to perform at least one of the following:

select an earliest feedback resource responsive to the determined quality level being less than a lowest threshold quality level based on the mapping; or decide not to cause the transmission of the feedback responsive to the determined quality level being higher than a highest threshold quality level.

5. The apparatus according to claim 1, wherein the at least one processing core is configured to cause the transmission of the feedback using a contention-based mechanism.

6. The apparatus according to claim 5, wherein the at least one processing core is configured to cause the transmission of the feedback to occur while the apparatus is in an idle mode with respect to a communication network that receives the feedback.

7. The apparatus according to claim 6, wherein the at least one processing core is configured to process a request from the communication network, and responsive to the request, transition to a connected state with respect to the communication network.

8. The apparatus according to claim 1, wherein at least one of:

feedback resources are service dependant; or quality levels are service dependant.

9. The apparatus according to claim 1, wherein the at least one processing core is configured to decide to suppress the transmission of the feedback responsive to receipt of modified radio parameters in the apparatus.

10. The apparatus according to claim 1, wherein the feedback comprises feedback concerning a broadcast service or a multicast service.

11. An apparatus comprising at least one processing core, and at least one non-transitory memory including computer program code, the at least one memory and the computer program code being configured to, with the at least one processing core, cause the apparatus at least to:

transmit information to devices;

provide to the devices a mapping from a set of quality level ranges to a set of feedback resources;

receive, from the devices, feedback concerning reception of the information, wherein feedback indicating a first reception quality is received on a first feedback resource and feedback indicating a second reception quality is received on a second feedback resource according to the provided mapping, where at least one received feedback is configured to indicate a lowest determined quality level range of the devices; and decide on modifying a transmission parameter based, at least partially, on the received feedback.

12. The apparatus according to claim 11, wherein the apparatus is configured to not listen to feedback on the second feedback resource if feedback is received on the first feedback resource.

13. The apparatus according to claim 11, wherein the at least one memory and the computer program code are configured to, with the at least one processing core, cause the apparatus to at least one of:

estimate a number of devices transmitting feedback on the first feedback resource, wherein estimating the number comprises estimating an interference over noise ratio concerning the first feedback resource; or modify a periodicity at which the transmission parameter is modified responsive to the feedback indicating few user equipments experience poor reception quality.

14. A method comprising:

storing received information in an apparatus;

determining a quality level at which the received information was received;

selecting, based, at least partially, on the determined quality level and a mapping from a set of quality level ranges to a set of feedback resources, a feedback resource, and deciding on causing transmission of feedback on the selected feedback resource, further comprising deciding to suppress the transmission of the feedback responsive to determining that another apparatus has transmitted feedback using a feedback resource associated with a first quality level that is inferior to the determined quality level.

15. The method according to claim 14, wherein the selected feedback resource comprises at least one of a time resource, a frequency resource, or a code.

16. The method according to claim 14, wherein the mapping comprises at least one of:

mapping an earlier feedback resource to a lower quality level range, or mapping a later feedback resource to a higher quality level range.

17. The method according to claim 16, wherein at least one of:

an earliest feedback resource is selected responsive to the determined quality level being less than a lowest threshold quality level based on the mapping, or deciding not to cause the transmission of the feedback responsive to the determined quality level being higher than a highest threshold quality level.

18. The method according to claim 14, wherein the transmission of the feedback is caused to occur at least one of:

using a contention-based mechanism; or while the apparatus is in an idle mode with respect to a communication network that receives the feedback.

* * * * *